US007702092B2

(12) United States Patent
Sheth et al.

(10) Patent No.: US 7,702,092 B2
(45) Date of Patent: Apr. 20, 2010

(54) COMMUNICATION SYSTEM AND METHOD OF ROUTING CALLS TO A TERMINATING END POINT

(75) Inventors: Niral Sheth, Austin, TX (US); Bernard Siu-Man Ku, Austin, TX (US); Jeffrey Paul Johnson, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1283 days.

(21) Appl. No.: 11/120,142

(22) Filed: May 2, 2005

(65) Prior Publication Data

US 2006/0245573 A1 Nov. 2, 2006

(51) Int. Cl.
*H04M 7/00* (2006.01)
*H04M 3/42* (2006.01)

(52) U.S. Cl. .............................. 379/221.13; 379/201.01
(58) Field of Classification Search ................. 370/352; 379/221.01, 221.13; 455/445
See application file for complete search history.

(56) References Cited

U.S. PATENT DOCUMENTS

| | | | |
|---|---|---|---|
| 5,881,145 A | 3/1999 | Giuhat et al. | |
| 6,021,126 A | 2/2000 | White et al. | |
| 6,535,599 B1 | 3/2003 | Torrey et al. | |
| 6,839,421 B2 | 1/2005 | Ferraro Esparza et al. | |
| 6,865,266 B1* | 3/2005 | Pershan | 379/221.13 |
| 2003/0007482 A1* | 1/2003 | Khello et al. | 370/352 |
| 2003/0032432 A1* | 2/2003 | Red et al. | 455/445 |
| 2003/0081754 A1* | 5/2003 | Esparza et al. | 379/221.01 |
| 2003/0133561 A1* | 7/2003 | Torrey et al. | 379/220.01 |
| 2004/0196858 A1 | 10/2004 | Tsai et al. | |

OTHER PUBLICATIONS

International Search Report and Written Opinion of the International Searching Authority for International Application No. PCT/US/13287, Mailed on Apr. 1, 2008.

* cited by examiner

*Primary Examiner*—Ahmad F Matar
*Assistant Examiner*—Sonia Gay
(74) *Attorney, Agent, or Firm*—Toler Law Group

(57) ABSTRACT

A method of determining a telephony network node for routing a call is disclosed. The method includes receiving a call request at a service provider node, the call request including a called number to reach a called party. The method further includes sending a combined telephone number mapping (ENUM) and local number portability (LNP) query from the service provider node to a remote ENUM database, the combined ENUM/LNP query including the called number. The method further includes receiving a response to the combined ENUM/LNP query at the service provider node. The response includes one of an internet protocol address that identifies a node of an internet protocol network, a local routing number (LRN) to be used to route the call to a uniquely identified switching node of a circuit-switched network, or a return of the called number to indicate that the called number can be used to route the call to the called party.

12 Claims, 3 Drawing Sheets

COMMUNICATION SYSTEM AND METHOD OF ROUTING CALLS TO A TERMINATING END POINT

FIELD OF THE DISCLOSURE

The present disclosure relates generally to a method and system of routing calls.

BACKGROUND

With certain conventional communication systems, the detection of Internet protocol (IP) terminating end points and ported public switch telephone network (PSTN) endpoints involves two separate process steps and two separate transactions within a telephony system. The detection of IP addresses involves a telephone number mapping (ENUM) query and ported number detection involves a local number portability (LNP) query. The two separate transactions and separate queries increases the cost and adds to latency of the call setup process. The increased cost and call latency may also impact call processing performance.

Thus, there is a need for an improved method and system of routing calls with respect to terminating end points.

DETAILED DESCRIPTION OF THE DRAWINGS

Figure 1:
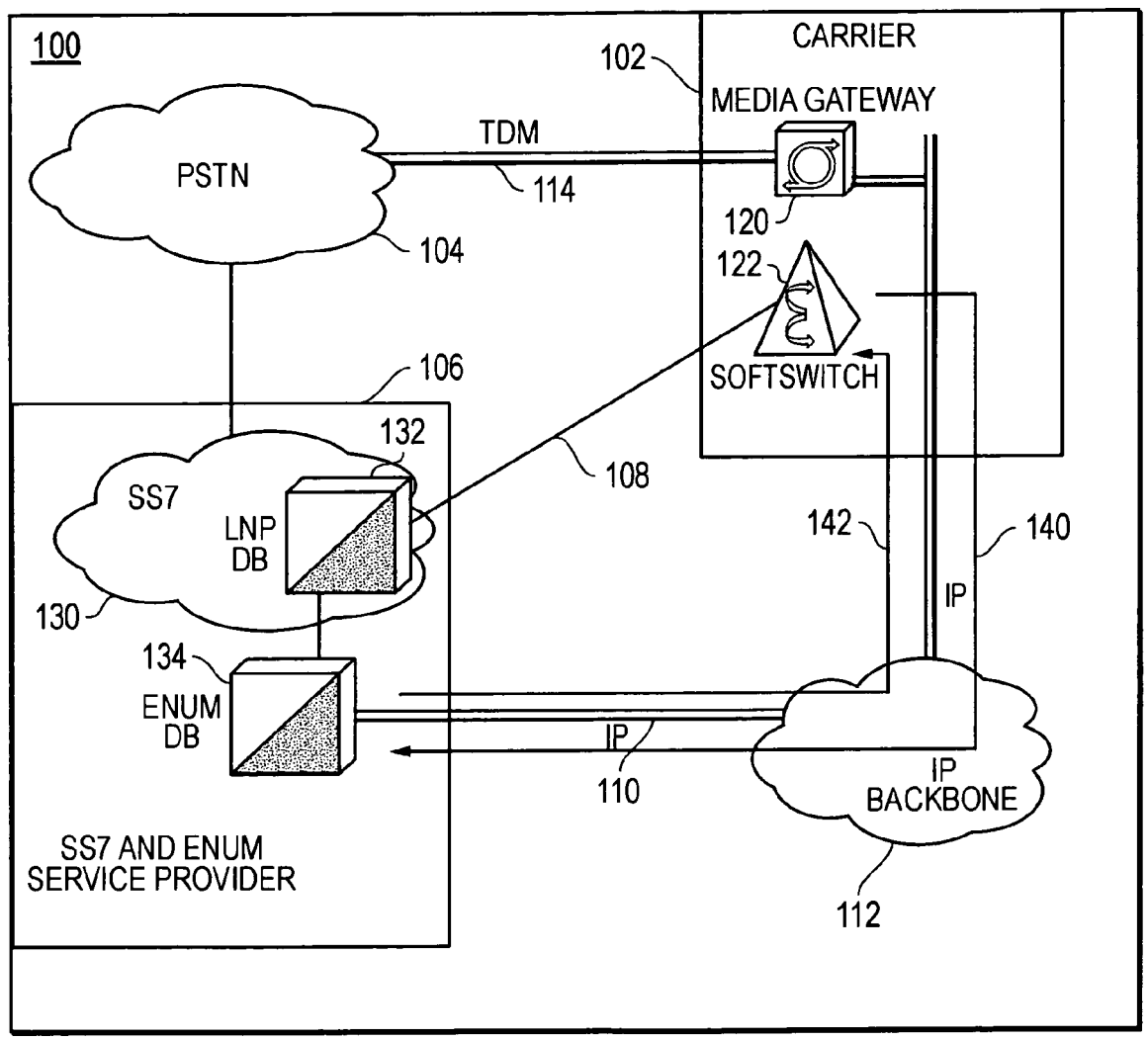
FIG. 1 is a general diagram that illustrates a communication system with an ENUM service provider.

In a particular embodiment, a method of determining a telephony network node for routing a call is disclosed. The method includes receiving a call request at a service provider node, the call request including a called number to reach a called party. The method further includes sending a combined telephone number mapping (ENUM) and local number portability (LNP) query from the service provider node to a remote ENUM database, the combined ENUM/LNP query including the called number. The method further includes receiving a response to the combined ENUM/LNP query at the service provider node, the response including one of an internet protocol address that identifies a node of an internet protocol network, a local routing number (LRN) to route the call to a uniquely identified switching node of a circuit-switched network, or a return of the called number to indicate that the called number can be used to route the call to the called party.

In another embodiment, the method of routing a call includes receiving a combined telephone number mapping (ENUM) and local number portability (LNP) query from a service provider node at an ENUM database, where the combined ENUM/LNP query includes a called number. The method further includes accessing the ENUM database using the called number to identify an internet protocol address that is associated with the called number. When the access to the ENUM database does not identify an internet protocol address, the method includes indicating that the called number is not an internet protocol terminating call and sending a query to a local number portability (LNP) database. The method further includes receiving a response from the local number portability database. The response from the local number portability database includes either a ported number or an indication that the called number is not a ported number.

In another embodiment, a communication system is disclosed that includes a service provider network node including a soft switch element. The soft switch element of the service provider network node has an interface to receive a call request, the call request including a called number to reach a called party. The soft switch element includes logic to send a combined telephone number mapping (ENUM) and local number portability (LNP) query to a remote ENUM database. The combined ENUM/LNP query includes the called number. The system includes a data network coupled to the service provider network node and to the remote ENUM database. The soft switch element of the service provider network node includes an interface to receive a response message to the combined ENUMILNP query. The response message includes one of an internet protocol address that identifies a node of an internet protocol network, a local routing number (LRN) to uniquely identify a switching node of a circuit-switched network, or an indication that the called number is not a ported number such that the called number can be used to route the call to the called party.

Referring to FIG. 1, a communication system 100 is illustrated. The communication system 100 may be used to provide a single query to determine if a number is an internet protocol (IP) endpoint or a ported number in a public switch telephone network (PSTN). The communication system 100 includes the PSTN 104 and a service provider network node 102. The communication system 100 also includes an Internet protocol (IP) backbone network 112 that is coupled to a remote SS7 and ENUM service provider 106. The service provider network node 102 includes a media gateway 120 and a soft switch 122. The service provider network node 102 is coupled to the PSTN 104 via a time division multiplex (TDM) link 114. In a particular embodiment, the TDM link 114 is a T1 line.

The service provider node 102 is coupled to the SS7 and ENUM service provider 106 via an IP connection 110 and also via a direct connection 108. The SS7 and ENUM provider 106 includes SS7 equipment 130 including a local number portability (LNP) database 132. The SS7 and ENUM service provider 106 also includes a telephone number mapping (ENUM) database 134 which is coupled to the LNP database 132 over a data link, such as an SS7 link or an IP data link.

During operation, the service provider network 102 receives a call from the PSTN 104 over the TDM link 114 at the media gateway 120. The call request is then forwarded to the soft switch element 122 for routing. The soft switch 122 receives the call request that includes a called number to identify a called party. In response to receiving the call request, the soft switch 122 executes program logic that sends a combined telephone number mapping (ENUM) and local number portability (LNP) query to the remote ENUM database 134 over the IP backbone network 112. The combined query is illustrated in FIG. 1 as a data message 140.

The data message 140 related to the combined ENUM/LNP query includes the called number. The called number may, in a particular embodiment, be a ten digit E.164 type number. The E.164 number may have been originally dialed by a caller at a telephone device such as a voice over IP (VoIP) end user device.

The ENUM database 134 receives the ENUM query via the data message 140. The received data message query is a combined ENUM and LNP query that is sent from the service provider node 102. The ENUM database, in response to receiving the combined ENUM/LNP query, accesses the ENUM internal database using the called number (such as the E.164 number) to determine whether the database includes an Internet protocol (IP) address that is associated with the called number. When the access to the ENUM database identifies an IP address, then the IP address may be provided in a response message from the ENUM database to the service provider network node 102. An example response message to the combined ENUM/LNP query is illustrated as the data message 142 passed over the IP backbone network 112.

When the access to the ENUM database 134 does not identify an IP address, then the particular called number is indicated as not having an Internet protocol network termination. In this case, the ENUM database 134 sends a local number portability query to the local number portability (LNP) database 132 over the link coupled therebetween. The LNP database 132 receives the LNP query from the ENUM database 134. The LNP query includes the called number and the LNP database 132 is accessed to determine whether the called number is identified as a ported number that has an associated local routing number (LRN). In the event that the called number has an associated local routing number, then the LNP database 132 provides the local routing number (LRN) associated with the ported number to the ENUM node 134. The LRN is used to route a call to a uniquely identified switching node of a circuit switched network, such as the PSTN 104.

In the event that the LNP database query indicates that the called number does not have an associated ported number, then the LNP database does not retrieve an LRN for the called number and instead, the LNP responds to the query from the ENUM database 134 with an indication that the called number is not a ported number. In a particular embodiment, the called number itself is returned as the response to the LNP database query to indicate that the called number does not have a ported number. After the ENUM database 134 receives the response to the LNP query from the LNP database 132, the ENUM database 134 prepares a response to the original combined ENUM/LNP query that was received from the service provider node 102. The response to the combined ENUM/LNP query includes one of an HP address to identify a node of an IP network, a local routing number (LRN) that is associated with detection of a ported number by the LNP database 132, or the called number itself, to indicate that there is no IP address in the ENUM database 134 and there is no ported number found within the LNP database 132. Thus, the response to the combined ENUM/LNP query may include an IP address for a direct VoIP connection, an LRN to identify a unique switching node of a circuit switched network, or the called number itself to identify a standard routing to the called number without requiring local number portability and without providing access to an IP address of an IP network. Thus, the response to the combined ENUM/LNP query provides information regarding portability and whether a packet switched or circuit switched routing should be utilized for the particular call to the called number.

Since each extra step in a call setup process increases the latency delay time and the associated costs of using an LNP database and an ENUM database, the disclosed system and method beneficially provides a single step using a combined ENUM/LNP query in response to detecting an IP or ported PSTN end point, thereby saving call setup time and the associated charges associated with the LNP/ENUM databases.

Figure 2:
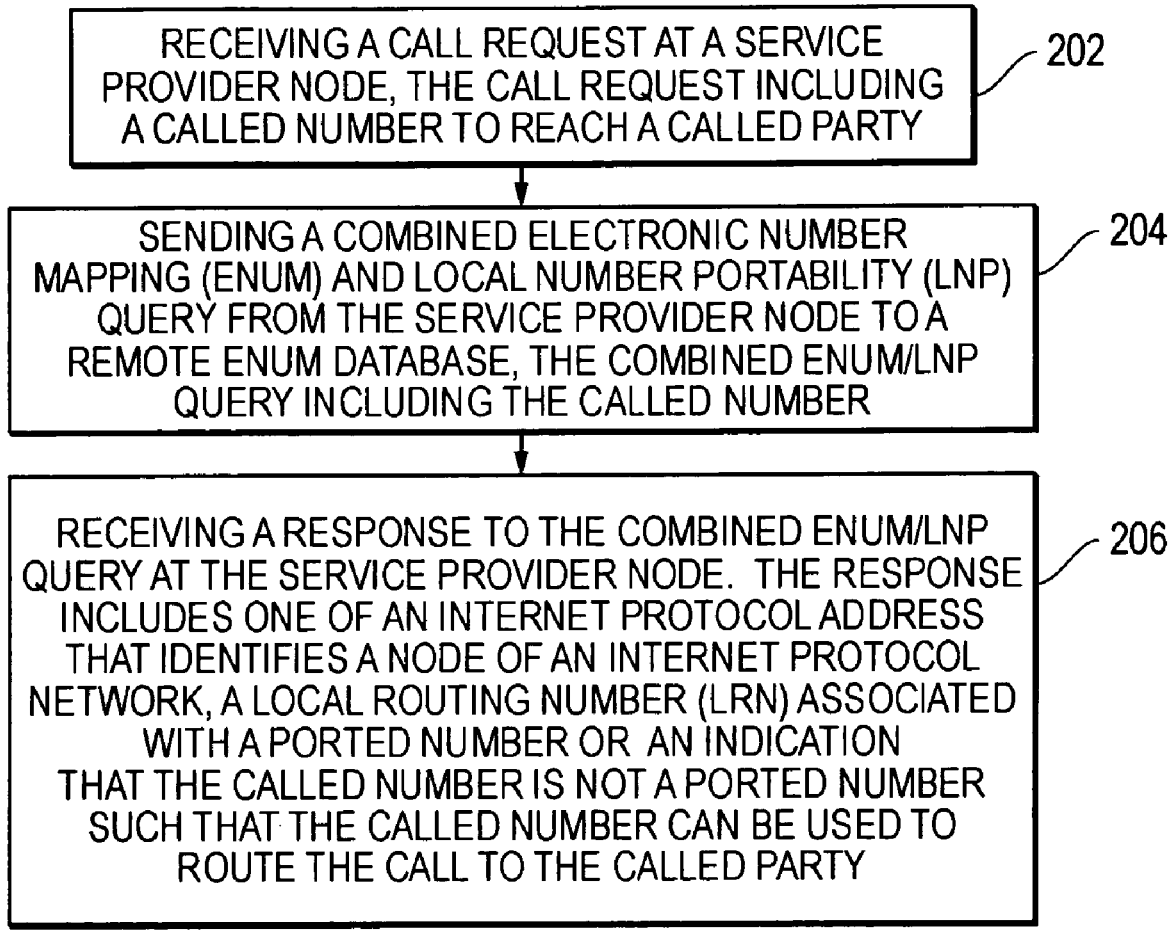
FIG. 2 is a flow chart that illustrates a method of routing a call using the communication system of FIG. 1.

Referring to FIG. 2, an illustrative method of using the communication system 100 is shown. A method of determining a telephony network node for routing a call is shown. The method includes receiving a call request at a service provider node where the call request includes a called number to reach a called party, as shown at 202. The method further includes sending a combined telephone number mapping (ENUM) and local number portability (LNP) query from a service provider node to a remote ENUM database, as shown at 204. It should be noted that the combined ENUM/LNP query may include the called number, such as an E.164 number. The method further includes receiving a response to the combined ENUMILNP query at the service provider node where the response includes either an Internet protocol address that identifies the node of an IP network, a local routing number (LRN) associated with a ported number and used to route the call to a uniquely identified switching node of a circuit switch network, or an indication that the called number is not a ported number such that the called number can be used to route the call to the called party. The response method step is illustrated at 206.

In a particular embodiment, the ENUM database makes a query after receiving the combined ENUM/LNP query message to an LNP database prior to providing the response to the combined ENUM/LNP query. In addition, in a particular embodiment, the query from the ENUM database to the LNP database includes the called number and the LNP database maps the called number to the local routing number (LRN) when the called number is identified as a ported number. The query from the ENUM database to the LNP database may be sent over an SS7 link or an IP data network connection. Alternatively, a proprietary data communication mechanism may be utilized such that the ENUM database may query the contents of the LNP database and receive the local number portability information.

Figure 3:
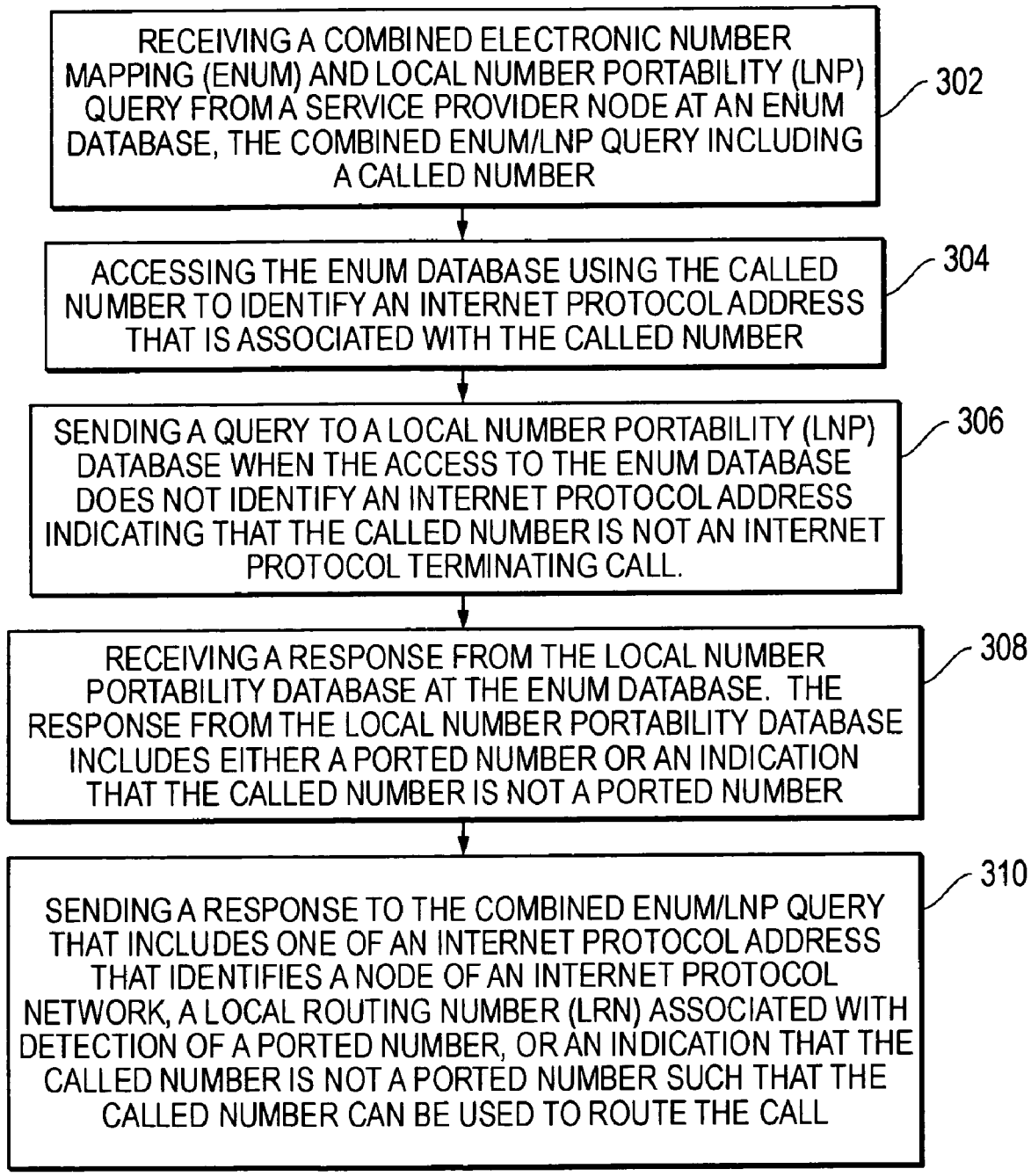
FIG. 3 is a flow chart that illustrates a method of processing a combined ENUMWLNP query at the ENUM service provider.

Referring to FIG. 3, a method of routing a call that may be used in connection with the communication system 100 is shown. The method includes receiving a combined telephone number mapping (ENUM) and local number portability (LNP) query from a service provider node at an ENUM database. The combined ENUM/LNP query includes a called number, as shown at 302. The method further includes accessing the ENUM database using the called number to identify an HP address that may be associated with the called number, as shown in 304. When access to the ENUM database does not identify an IP address, indicating that the called number is not an IP termination call, the ENUM database sends a query to a local number portability (LNP) database, as shown at 306. The ENUM database receives a response from the LNP database, as shown at 308. The response from the LNP database includes either a local routing number or an indication that the called number is not a ported number, such as a return of the same called number. The method further includes sending a response to the combined ENUMILNP query to the service provider node after accessing the ENUM database and the LNP database (for non IP calls), as shown at 310. In a particular embodiment, the response to the combined ENUM/LNP query includes an IP address that identifies a node of an IP network, an LRN associated with a ported number, or an indication that the called number is not a ported number such that the called number can be used to route the call.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing a call, comprising:

receiving a combined telephone number mapping (ENUM) and local number portability (LNP) query from a service provider node at an ENUM database, the combined ENUM and LNP query including a called number;

accessing the ENUM database using the called number to identify an internet protocol address that is associated with the called number;

when the access to the ENUM database does not identify an internet protocol address, indicating that the called number is not an internet protocol terminating call, sending a query to a local number portability (LNP) database directly from the ENUM database to the LNP database; and receiving a response from the local number portability database, the response from the local number portability database including either a ported number or an indication that the called number is not a ported number.

2. The method of claim 1, wherein the called number is returned by the local portability number database to indicate that the called number is not a ported number.

3. The method of claim 1, further comprising sending a response to the combined ENUM and LNP query to the service provider node after accessing the ENUM database.

4. The method of claim 3, further comprising sending the response to the combined ENUM and LNP query after receiving the response from the LNP database at the ENUM database.

5. The method of claim 3, wherein the response to the combined ENUM and LNP query includes one of an internet protocol address that identifies a node of an internet protocol network, a local routing number (LRN) associated with detection of a ported number, or an indication that the called number is not a ported number such that the called number can be used to route the call.

6. A communication systems comprising:

a local number portability (LNP) database including a plurality of stored local routing numbers that correspond to ported numbers;

a combined telephone number mapping (ENUM) database coupled to the LNP database via a data connection, wherein when an access to the ENUM database does not identify an internet protocol address, the ENUM database can send a query directly to the LNP database to retrieve at least one of the stored local routing numbers; and a service provider node to receive a response to a combined ENUM and LNP query, the response including one of an internet protocol address that identifies a node of an internet protocol network, a local routing number (LRN) to be used to route the call to a uniquely identified switching node of a circuit-switched network, or a return of a called number to indicate that the called number can be used to route the call to the called party.

7. The communication system of claim 6, wherein the ENUM database includes logic to receive a combined telephone number mapping (ENUM) and local number portability (LNP) query from a service provider node, the combined query including a called number, and wherein the ENUM database includes logic to initiate a query to the local number portability database.

8. The communication system of claim 7, wherein the ENUM database further includes logic to receive a response from the local number portability database, the response from the local number portability database including either a ported number or an indication that the called number is not a ported number.

9. The communication system of claim 8, wherein the ENUM database further includes logic to send a response to the combined ENUM and LNP query to the service provider.

10. The communication system of claim 9, wherein the ENUM database sends the response to the combined ENUM and LNP query after receiving the response from the LNP database.

11. The communication system of claim 6, wherein the data connection is a signaling system seven (SS7) link.

12. The communication system of claim 6, wherein the data connection is an Internet Protocol (IP) connection.

* * * * *